United States Patent [19]
Fenton et al.

[11] Patent Number: 6,128,557
[45] Date of Patent: Oct. 3, 2000

[54] METHOD AND APPARATUS USING GPS TO DETERMINE POSITION AND ATTITUDE OF A ROTATING VEHICLE

[75] Inventors: Patrick C. Fenton; Waldemar Kunysz, both of Calgary, Canada

[73] Assignee: NovAtel Inc., Calgary, Canada

[21] Appl. No.: 09/154,924

[22] Filed: Sep. 17, 1998

[51] Int. Cl.$^7$ ................................. G05D 1/00; G06F 7/00
[52] U.S. Cl. ......................... 701/13; 701/214; 342/357.02
[58] Field of Search ............... 701/13, 213, 214, 701/215; 342/357.01, 357.02, 357.06, 357.11, 358; 375/208, 343, 347

[56] References Cited

U.S. PATENT DOCUMENTS

| | | | |
|---|---|---|---|
| 4,785,463 | 11/1988 | Janc et al. | 375/1 |
| 5,185,610 | 2/1993 | Ward et al. | 342/357 |
| 5,808,582 | 9/1998 | Woo | 342/357 |

FOREIGN PATENT DOCUMENTS

0806679A1  11/1997  European Pat. Off. .......... G01S 1/04

OTHER PUBLICATIONS

Spacecraft Attitude Control Using GPS Carrier Phase, by E. Glenn Lightsey. Published by the American Institute of Aernautics and Astronautics, Inc.; chapter 16, pp. 461–480. 1995 (Month is not available).

Spacecraft Attitude Determination by Kalman Filtering of Global Positioning System Signals by Stephen J. Fujikawa and Darrell F. Zimbelman. Published by the American Institute of Aernoautics and Astronautics, Inc.; pp. 1365–1371. Nov./Dec. 1995.

*Primary Examiner*—Tan Nguyen
*Attorney, Agent, or Firm*—Cesari and McKenna, LLP

[57] ABSTRACT

Apparatus using a global positioning system (GPS) for finding out the attitude of a rotating space vehicle employs first and second antennae mounted opposite from each other on a circumference of the body of the rotating space vehicle. The antennae receive GPS satellite signals in their channels. A control and tracking loop processor monitors the signal strength in each channel. Phase errors produced by phase discriminators of each channel are combined to produce a spin signature which is used to calculate the vehicle spin rate and vehicle attitude.

3 Claims, 9 Drawing Sheets

METHOD AND APPARATUS USING GPS TO DETERMINE POSITION AND ATTITUDE OF A ROTATING VEHICLE

BACKGROUND OF THE INVENTION

The Global Positioning System (GPS) has been used for many years to determined position and attitude of a moving vehicle. Such a system is particularly difficult to implement on a space vehicle due to its rotational spin. For example, an antenna mounted on the fuselage will experience "shadowing" wherein the vehicle body periodically blocks reception of a GPS satellite signal.

The most common GPS attitude-sensing system is based on short base line interferometric processing techniques. It employs a pair of spaced-apart antennas receiving signals from the same GPS satellites. The antennas are connected to conventional GPS receivers which sense the GPS carrier phases at the antennas. The attitude of the vehicle can be readily calculated from the phase differences and the inter-antenna distance.

As an alternative to the multi-antenna systems, another prior system utilizes a single rotating antenna mounted at an offset from the spin axis of a rotating vehicle. The rotating antenna introduces a sine wave modulation on the "normal" carrier phase measurements. The frequency of the modulation corresponds to the rotational rate of the vehicle; the amplitude of the modulation corresponds to the angle of incidence between the direction of the GPS satellite and the rotational plain of the vehicle; and the phase of the modulation corresponds to the satellite azimuth in the rotational plane.

These prior systems have significant constraints which render them unsuitable for use on a vehicle with a high rotational rate. Specifically, they require that the receivers maintain "lock" with a minimum of four satellites for extended periods. In addition, these systems require that their antennas simultaneously view all satellites used and this is impossible on a rotating vehicle. Space vehicles also present special challenges for GPS receiver tracking technology. The relatively high spin rate of a space vehicle, when combined with the large fuselage diameter, may produce a very large acceleration dynamic on tracking loops. Linear velocity, acceleration and jerk (change of acceleration) caused by the activation and deactivation of booster stages also produce dynamics that significantly impact tracking loop performance.

What is needed, therefore, is an improved method for tracking GPS satellite signals to accurately determine the position, acceleration, attitude and rotational rate of a space vehicle having a high rotational speed. The method must be capable of operating without continuous signal power and must employ wide noise bandwidth tracking loops to handle vehicle dynamics.

SUMMARY OF THE INVENTION

A GPS pointing system incorporating the invention includes a pair of antennas mounted opposite from each other on a circumference on the body of the rotating vehicle for receiving GPS satellite signals; a multi-channel receiver having a separate logic channel for each GPS satellite signal observed by the receiver; and, within each logic channel, a pair of processing channels, one for each antenna. Specifically, in each logic channel, the signals from the two antennas are separately processed to develop two phase-error and two frequency-update signals. The frequency updates are used to produce a single update for alignment of the received signals of each channel with the locally generated carrier and PRN code references. They thus provide a single range estimate and carrier phase estimate for the logic channel. These estimates correspond to the positioning of the center of the antenna plane of rotation.

More specifically, each processing channel includes, in effect, a separate phase discriminator that measures the difference in phase between the local carrier and the carrier received by one of the antennas. A control and tracking loop processor monitors the received signal strength of each channel. If the signal strengths of both channels exceed a predetermined threshold, the frequency updates are averaged to essentially eliminate the Doppler shift due to vehicle rotation and the result is used to align the received signal. That is, because the rotating antennas are moving in opposite directions relative to the received signal, the rotational Doppler shifts in the two channels are of equal and opposite polarity and thus can be eliminated by averaging the shifts. If only a single channel exceeds the signal strength threshold, the frequency update of that channel is used to align the received signal. In this circumstance, the rotational Doppler shift of the signal is minimal because the antenna movement is then largely perpendicular to the direction of the GPS satellite signal, and because a low pass filter further reduces any Doppler shift present in the discriminator output by time-averaging the signal.

The phase errors produced by the phase discriminators of each channel are combined to produce a spin signature. The spin signature is then used to calculate vehicle spin rate and attitude.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
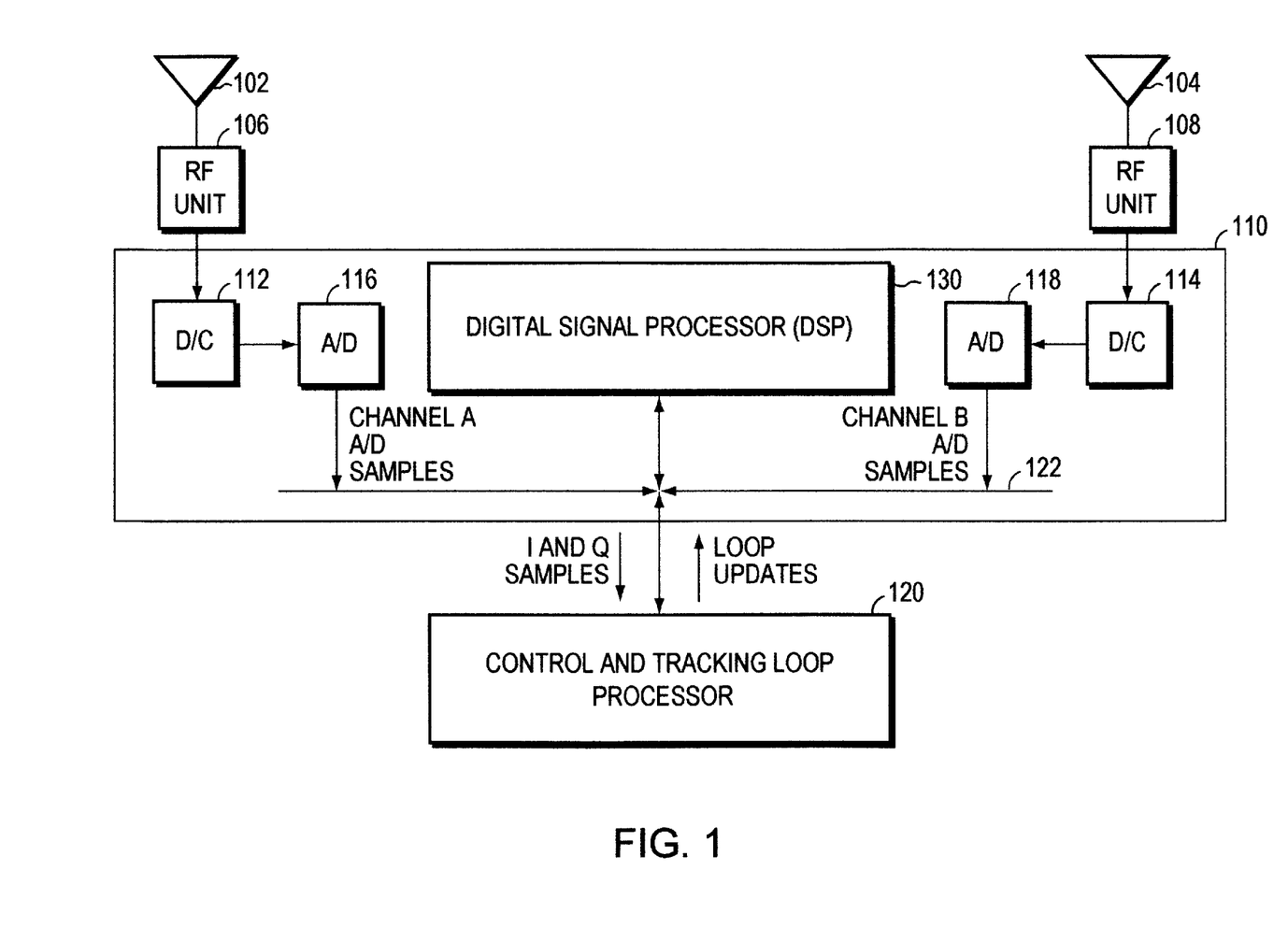
FIG. 1 is a block diagram of a GPS receiver system incorporating the invention.

As shown in FIG. 1, a GPS pointing system incorporating the invention is comprised of two antennas 102, 104 with their associated RF units 106, 108, a multi-channel receiver unit 110, and a control and tracking loop (CTL) processor 120. Although the system is designed to receive and process signals from four or more GPS satellites, for simplicity only the processing of a single GPS satellite signal will be described. The antennas are mounted facing outward 180 degrees apart on a circumference of the vehicle body. The RF units 106, 108 include a filter and low noise amplifier (not shown). The receiver unit 110 includes downconverters 112, 114 and digitizers 116, 118 for each antenna channel, along with a digital signal processor (DSP) 130. The DSP 130 correlates each of the digitized received signals with local PRN code references. The correlator output values are used by the CTL processor 120 to generate, inter alia, signal-to-noise ratio (SNR) estimates, pointing information (position, acceleration, attitude, and rotational rate), and tracking loop updates.

Figure 2:
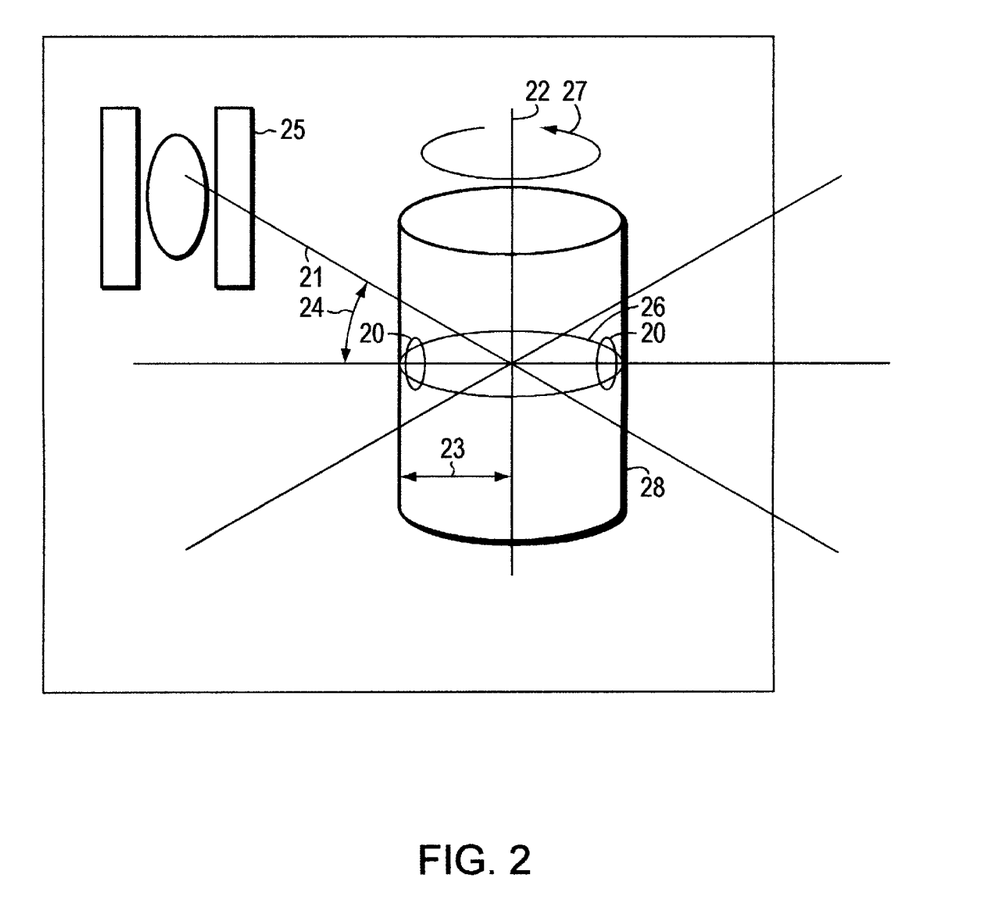
FIG. 2 is a block diagram of a deployed system.

Deployment of the system is shown in FIG. 2. The observed range at an antenna position 20 is given by $$\text{Range} = R + r \cos(e) \sin(\omega t + \phi) \quad (1)$$

where R is the pseudorange 21 at the center of the spin axis 22, r is the radius 23 of the vehicle, e is the elevation angle 24 of the satellite 25 relative to the antenna spin plane 26, $\omega$ is the rotational rate 27 of the vehicle, $\phi$ is horizontal azimuth of the satellite 25 with respect to the spin plane at t=0, and t is the measurement time. The second term is the "spin signature" of the satellite and represents the antenna position offset relative to the vehicle center position.

Figure 3:
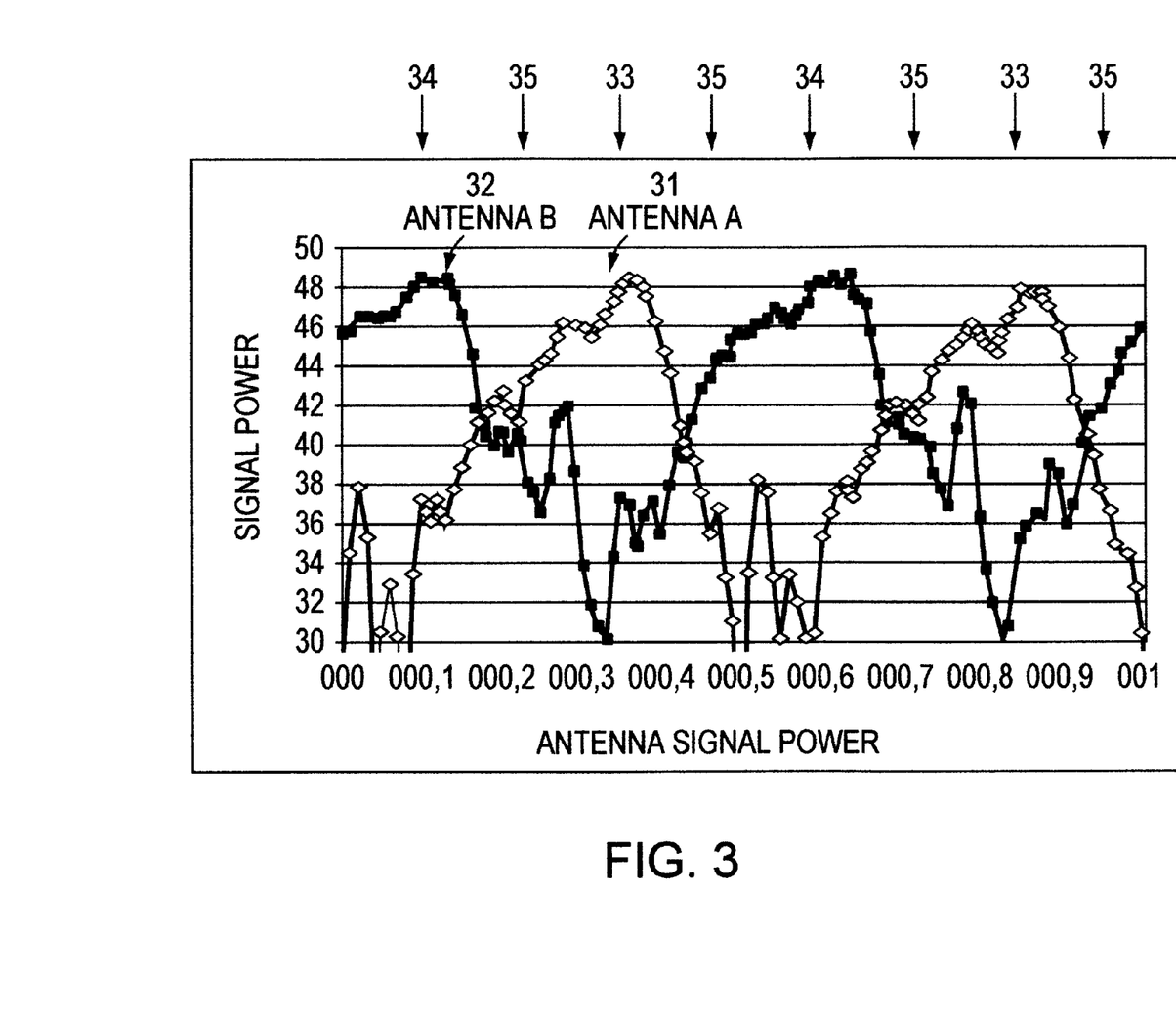
FIG. 3 is a plot of received signal power.

An illustrative plot of received signal powers is shown in FIG. 3. The signal powers of antennas A and B are plotted on curves 31 and 32, respectively. In this example, the signals were received from a transmitter source positioned on the antenna spin plane 26. The vehicle 28 was rotating at a constant 2 Hz rate and the alternating power fluctuations between the signals of antennas A and B can easily be seen. Antenna A is in full view of the transmit source and antenna B is blocked by the vehicle at regions 33, vice versa at regions 34, and both antennas are in view of the source at regions 35.

Figure 4:
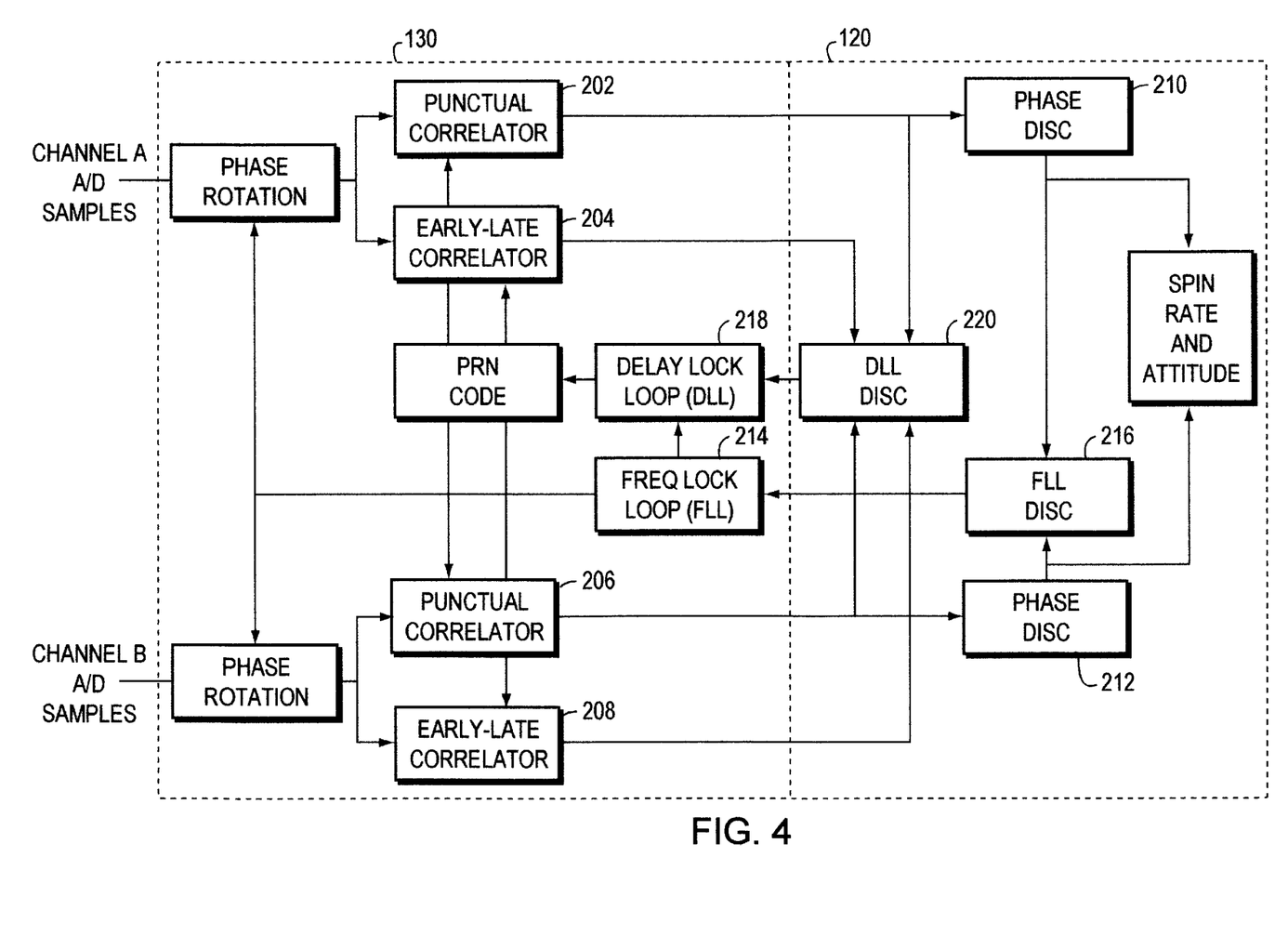
FIG. 4 is a block diagram of a receiver logic channel.

A diagram of a receiver logic channel is shown in FIG. 4. The logic channel includes two processing channels (one for each antenna) and a common tracking loop. The processing channels each include a punctual correlator 202, 206 and an early-late correlator 204, 208. The tracking loop includes a phase discriminator 210, 212 for each processing channel, a frequency lock loop (FLL) 214 with a FLL discriminator 216, and a delay lock loop (DLL) 218 with a DLL discriminator 220.

The phase discriminators produce phase error signals averaged over a code epoch, and the frequency lock loop (FLL) discriminator 216 calculates the difference in the phase error between two successive epochs to produce a frequency shift update ($D_f$). The frequency shift update is defined in radians per up-date-rate as $$Df = \operatorname{atan}(Q_{pt}/I_{pt}) - \operatorname{atan}(Q_{p(t-1)}/I_{p(t-1)}), \quad (2)$$

where $I_{pt}$ and $Q_{pt}$ are punctual correlator output values at time t. The frequency shift includes contributions from, inter alia, satellite movement, vehicle linear movement and rotation, and differences in vehicle and satellite frequency references. The FLL discriminator 216 also strips the 50 Hz GPS broadcast navigation data from the phase error update signal before feeding the signal through a 2nd-order loop filter.

Figure 6:
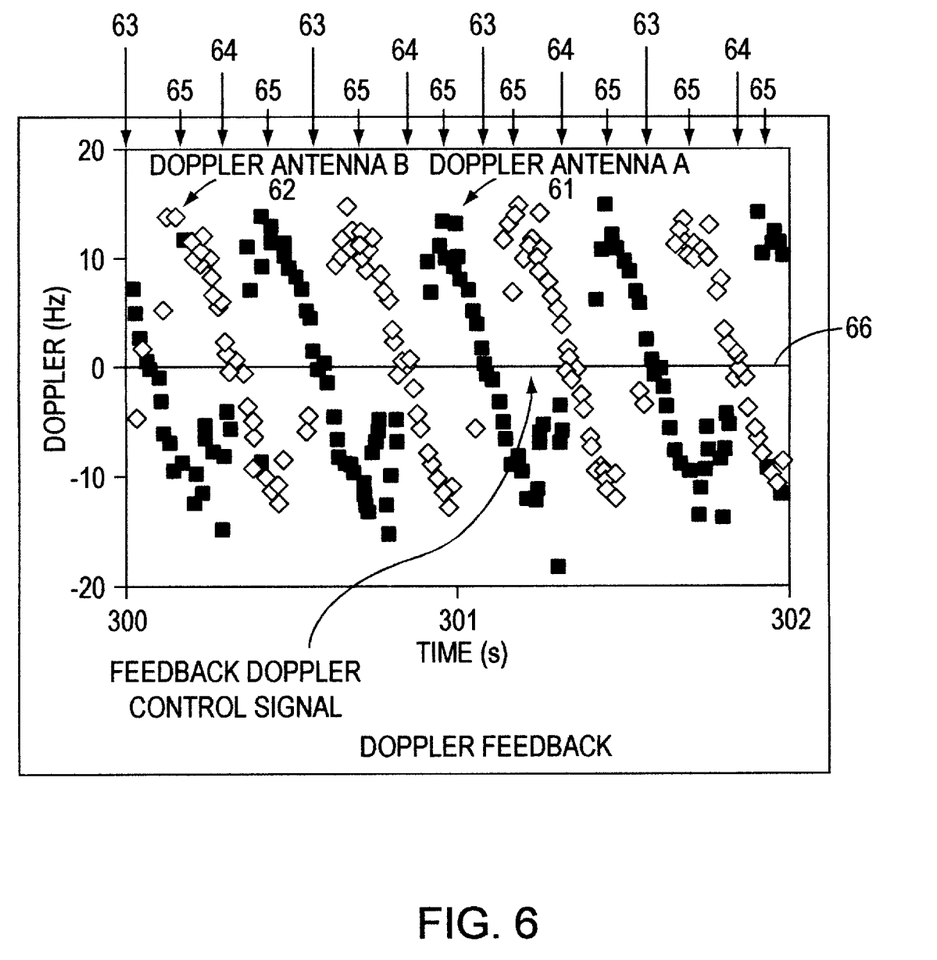
FIG. 6 is a plot of received signal Doppler shift.
Figure 7:
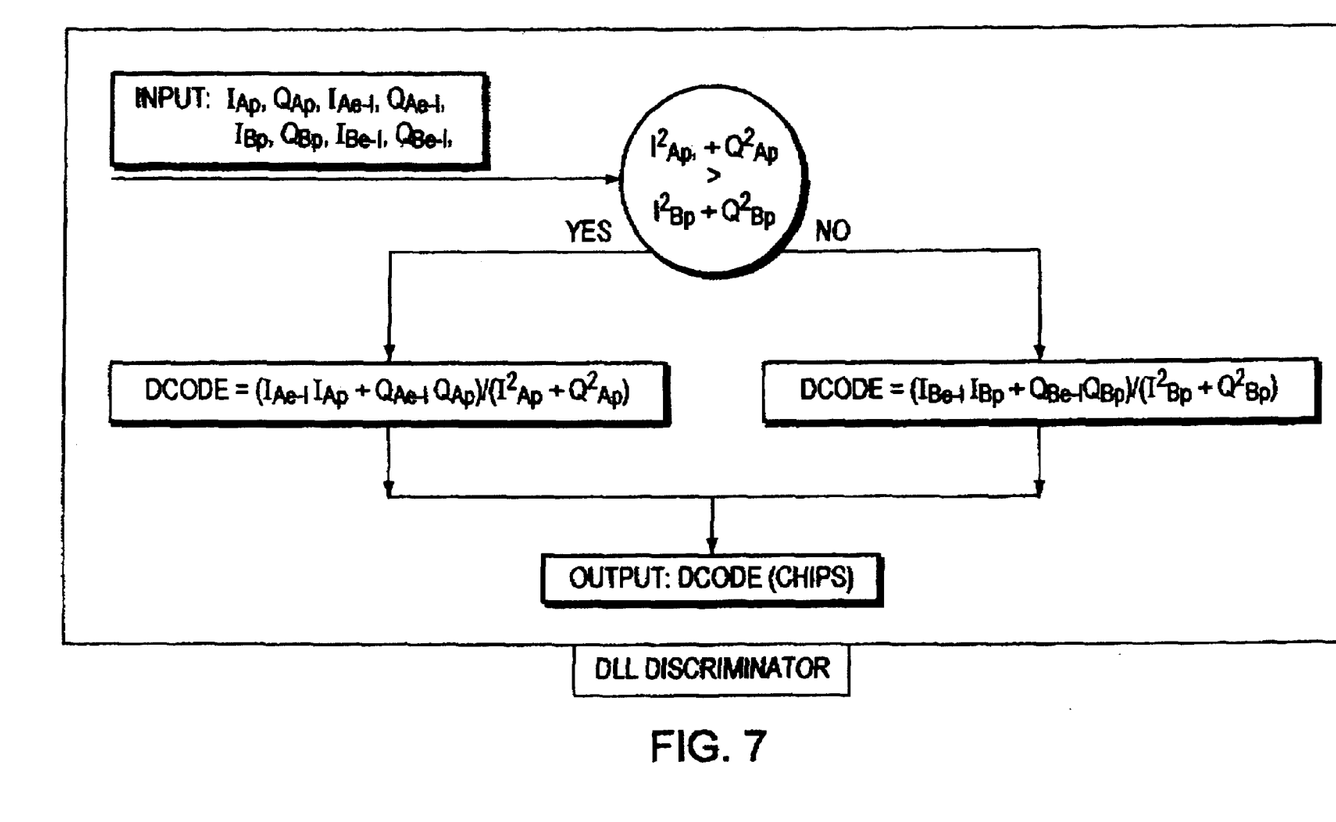
FIG. 7 is a DLL discriminator algorithm.

An illustrative plot of the rotational Doppler shift present in signals of FIG. 3 is shown in FIG. 6. The Doppler shifts of the signals of antennas A and B are plotted on curves 61 and 62, respectively. Antenna A is in fall view of the transmit source and antenna B is block by the vehicle at region 63, vice versa at region 64, and both antennas are in view of the source at region 65.

Figure 5:
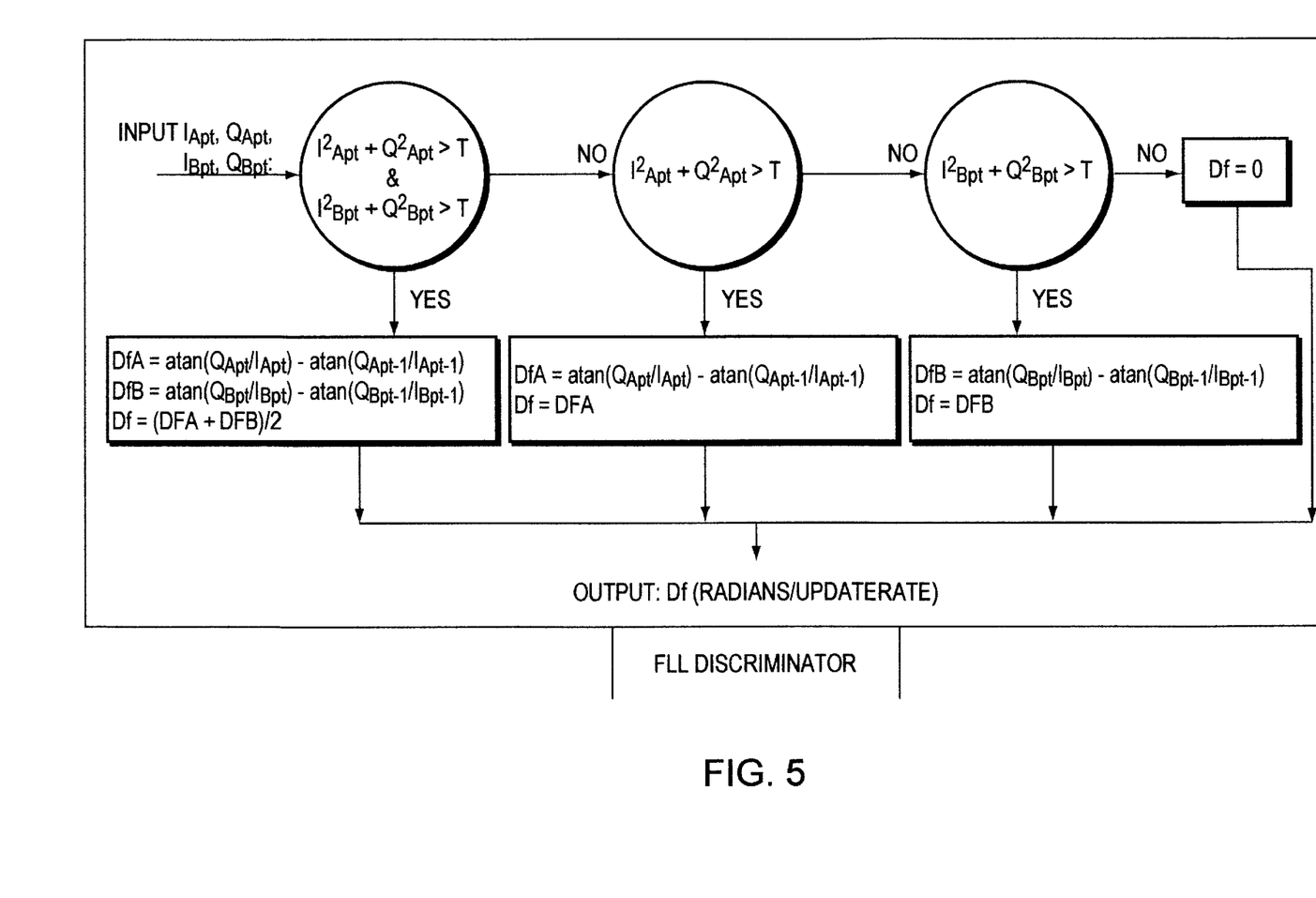
FIG. 5 is an FLL discriminator algorithm.

The FLL discriminator 216 of present invention essentially eliminates the rotational Doppler shift component from the frequency shift updates by averaging the updates of the two processing channels. The FLL discriminator algorithm is shown in FIG. 5. When both processing channels are receiving a GPS satellite signal, i.e., the received signal power ($P = I_{pt}^2 + Q_{pt}^2$) in each channel exceeds a predetermined threshold, T, the FLL discriminator outputs an average frequency shift:

$$Df_{avg} = (Df_A + Df_B)/2. \quad (3)$$

The difference between the average frequency shift, $Df_{avg}$, and the frequency shift in a particular channel, $Df_A$ or $Df_B$, represents the Doppler shift attributable to the rotational spin of the space vehicle. The Doppler shift in each channel will be of equal and of opposing polarity:

$$Df_{Aerror} = Df_{avg} - Df_A = -Df_{Berror}. \quad (4)$$

This discriminator error, or correction, therefore reflects the rotational spin rate of the space vehicle.

When only a single processing channel has sufficient signal strength to exceed the predetermined threshold, i.e., the other channel is blocked, the FLL discriminator selects the frequency shift update calculated for that channel. Because the Doppler shift component due to vehicle rotation is minimal at this orientation, as shown at regions 63 and 64, and because the output filter time-averages any shift present in the signal, no correction is required. When neither processing channel has sufficient signal strength, the output is set to zero.

Figure 8:
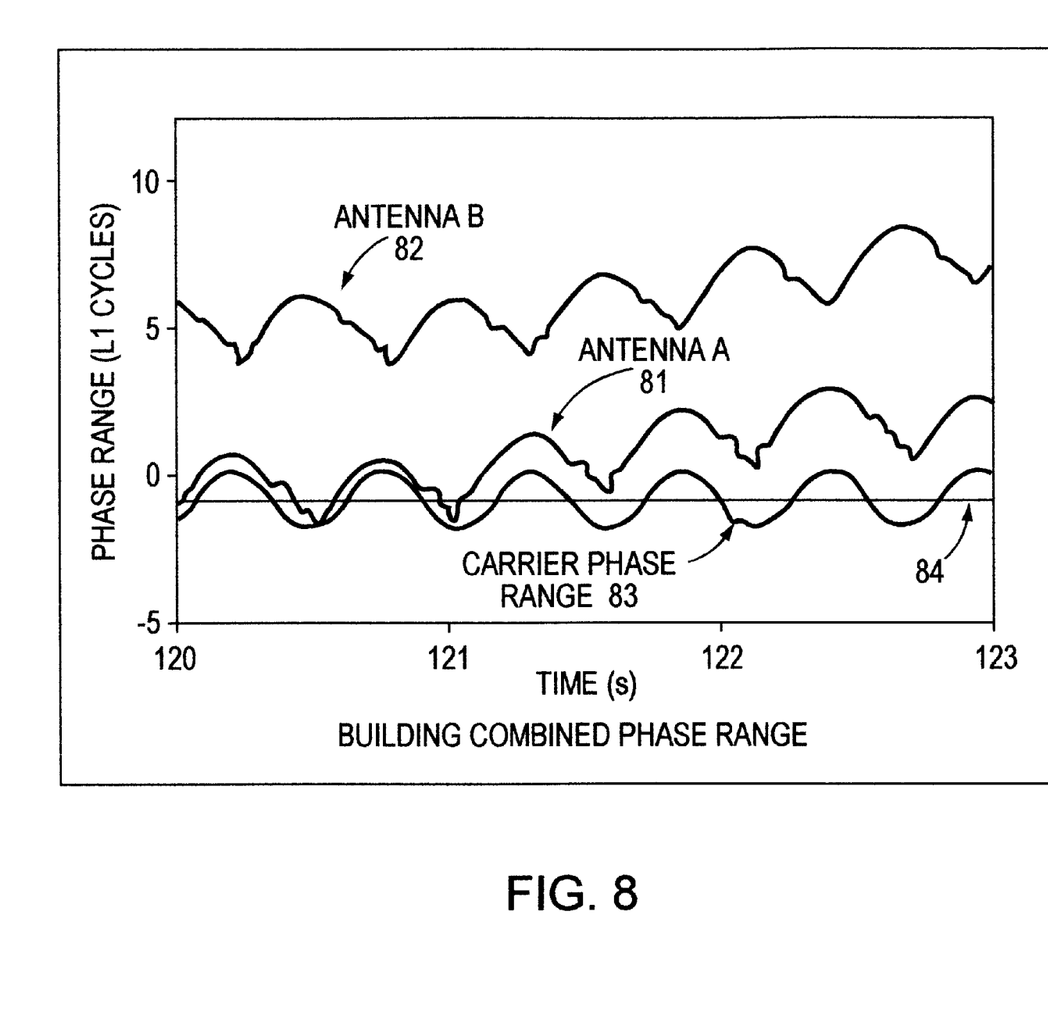
FIG. 8 is a plot of combined phase range.

Vehicle attitude and rotational rate are determined from the spin signature and spin data of each satellite. The satellite spin signature is constructed by assembling a composite, or combined, phase range (error) signal from phase error data of each processing channel as determined by their relative signal strengths. An illustrative plot of a combined phase range signal as shown in FIG. 8 includes the channel A phase error curve 81 and the channel B phase error curve 82. The ragged bottoms of each cycle on these curves are due to the vehicle blockage and the wrapping of the satellite signal around the fuselage.

The nature of the FLL discriminator algorithm, and the asymmetric use of pieces of data from each processing channel due to their respective asymmetric and dissimilar antenna patterns, cause the measured phase error data to "wander" somewhat. The wander is reflected in a trend line (not shown) which introduces a slope into the phase range curve of the processing channels. The wander has been removed from the combined phase range curve 83 by subtracting out the trend line.

Figure 9:
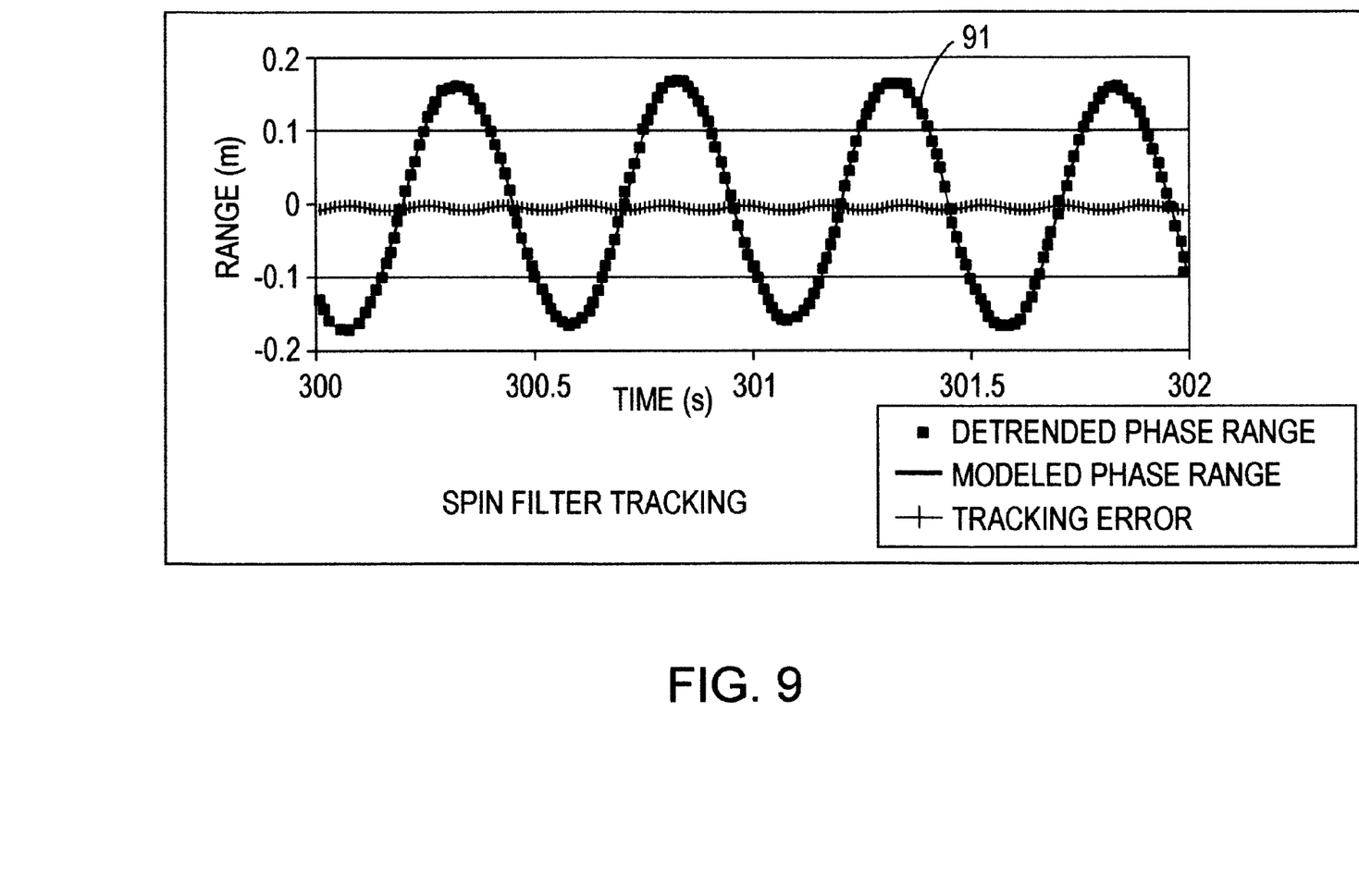
FIG. 9 is a plot of a spin signature.

The spin signature is then modeled by computing a best sine wave fit to the combined phase range curve data. The model spin signature generated from the samples of FIG. 3 is illustrated in the modeled spin signature 91 of FIG. 9. Specifically, the rotational rate can be determined by performing zero-crossing detection on the spin signature, and the attitude, e, can be determined from the amplitude of the spin signature, i.e. $e = \cos^{-1} \operatorname{Ha}(A/r)$, where A is the maximum amplitude of spin signature and r is the radius of the vehicle. These values are collected for four or more satellites and are further processed using a least square approach to compute vehicle orientation.

Although the foregoing discussion has been based on a two antenna system, it is recognized that additional antennas may be mounted around the vehicle body circumference to achieve similar results.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method using GPS signals to determine the position, acceleration, attitude and rotational rate of a space vehicle comprising:

(a) detecting a GPS satellite signal in each of two antenna mounted 180 degrees apart on a circumference on fuselage of said space vehicle;

(b) processing each of said signals in separate receiver channels to develop two phase error signals, said receiver channels having a common tracking loop;

(c) calculating a signal strength for each of said signals;

(d) determining from said phase error signals a frequency shift update;

(e) determining a delay code shift update;

(f) generating a spin signature by combining said phase error signals from each of said processing channels; and (g) calculating from said spin signature a vehicle rotational rate and attitude.

2. The method of claim 1, wherein said frequency shift update is determined by (i) calculating from said phase error signals an averaged frequency shift from both of said signals if said signal strengths of both of said processing channels exceed a predetermined threshold, or (ii) calculating from said phase error signal of one of said processing channels a frequency shift if said signal strength of one of said processing channels exceeds said threshold, or (iii) setting the update equal to zero if neither of said signals strengths of said processing channels exceeds said threshold.

3. The method of claim 1, wherein said delay code shift update is determined by (i) calculating a shift from punctual and early-late correlator samples of one of said processing channels if signal strength of said one of said processing channels exceeds said threshold and exceeds signal strength of other of said processing channels, or (ii) not changing the update if neither of said signal strengths of said processing channels exceeds said threshold.

* * * * *